US009730087B2

(12) United States Patent
Son (10) Patent No.: US 9,730,087 B2
(45) Date of Patent: Aug. 8, 2017

(54) METHOD AND APPARATUS FOR ANALYZING INTERFERENCE IN TIME-SPACE DIMENSIONS

(71) Applicant: Electronics and Telecommunications Research Institute, Daejeon (KR)

(72) Inventor: Ho Kyung Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 312 days.

(21) Appl. No.: 14/601,341

(22) Filed: Jan. 21, 2015

(65) Prior Publication Data

US 2015/0208261 A1 Jul. 23, 2015

(30) Foreign Application Priority Data

Jan. 21, 2014 (KR) ........................ 10-2014-0007321

(51) Int. Cl.
*H04B 17/00* (2015.01)
*H04W 24/02* (2009.01)
*H04W 16/18* (2009.01)

(52) U.S. Cl.
CPC ........... *H04W 24/02* (2013.01); *H04W 16/18* (2013.01)

(58) Field of Classification Search
None
See application file for complete search history.

(56) References Cited

U.S. PATENT DOCUMENTS

| 6,950,665 | B2 | 9/2005 | Swift et al. | |
|---|---|---|---|---|
| 7,298,316 | B2 * | 11/2007 | Tsai | G01S 7/414 342/159 |
| 7,639,986 | B2 * | 12/2009 | Vincent | H04H 20/67 455/296 |
| 8,254,484 | B2 * | 8/2012 | Kim | H04L 1/0045 327/551 |
| 9,226,134 | B2 * | 12/2015 | Kent | H04W 28/18 |
| 9,232,405 | B2 * | 1/2016 | Dimou | H04W 16/10 |
| 9,271,243 | B2 * | 2/2016 | Yoon | H04W 24/02 |
| 2009/0027650 | A1 * | 1/2009 | Yamazoe | G03F 1/36 355/77 |
| 2010/0167654 | A1 | 7/2010 | Son et al. | |
| 2013/0244582 | A1 | 9/2013 | Son | |

FOREIGN PATENT DOCUMENTS

| KR | 1020110101033 A | 9/2011 |
|---|---|---|
| KR | 1020120059287 A | 6/2012 |

OTHER PUBLICATIONS

Young-Hwan Kim et al., Monte Carlo Based Interference Analysis of 900MHz Passive RFID Systems, 2006.

* cited by examiner

*Primary Examiner* — Tuan A Tran (74) *Attorney, Agent, or Firm* — William Park & Associates Ltd.

(57) ABSTRACT

Disclosed herein are a method and apparatus for analyzing interference in the time-space dimensions. The apparatus includes an evaluation area partition unit configured to partition an evaluation area into lattices in order for a receiver to determine whether a permitted interference level at which interference needs to be accepted is satisfied or not and an interference analysis unit configured to spatially evaluate the amount of interference in each of the lattices based on a result of temporal evaluation of the amount of interference in each of the lattices.

18 Claims, 9 Drawing Sheets

METHOD AND APPARATUS FOR ANALYZING INTERFERENCE IN TIME-SPACE DIMENSIONS

Priority to Korean patent application number 10-2014-0007321 filed on Jan. 21, 2014, the entire disclosure of which is incorporated by reference herein, is claimed.

BACKGROUND OF THE INVENTION

Field of the Invention

The present invention relates to a method and apparatus for analyzing interference in the time-space dimensions and, more particularly, to a method and apparatus for analyzing interference in the time-space dimensions, which evaluate whether or not permitted wireless communication devices satisfy a permitted interference level at which interference needs to be accepted within a permitted area.

Discussion of the Related Art

The use of specific frequency bands having a propagation characteristic advantageous for wireless communication is increased, but the development of new services and wireless technologies using such frequency bands is limited due to the frequency preoccupancy of existing wireless service systems. Furthermore, since higher frequency bands are used to avoid preoccupied frequency bands, there is an urgent need to introduce a new paradigm of frequency use because efficiency of wireless communication is expected to be deteriorated.

In order to introduce a new paradigm of frequency use, frequency use efficiency for solving a frequency shortage problem needs to be maximized. To this end, there is a need to change a new paradigm that may be flexibly used without the designation, assignment, and permission of a frequency, that is, a national radio wave policy.

Conventional frequency management systems are managed according to transmitters or according to frequencies and transmission output. Methods chiefly used for an interference analysis between wireless communication systems for such conventional management according to transmitters basically include a Minimum Coupling Loss (MCL) method and a Monte-Carlo method.

In the MCL method, a minimum distance in which a plurality of systems needs to be spaced apart so that they may operate without mutual interference through system parameters and a radio wave model, that is, an isolated distance or an isolated frequency, is calculated. In such an MCL method, a great isolated distance or isolated frequency (i.e., a guard band) that is not suitable to be practically applied is calculated because the activity factor of a transceiver is neglected and the worst case where a signal of a specific size continues to be received is assumed. The worst results obtained through the MCL method are reasonably under discussion because actual systems normally operate with a minimum isolated frequency or isolated distance that is much smaller compared to the results obtained through the MCL method.

In the Monte-Carlo method, all parameter values related to interference environments are designated, and an interference probability is statistically computed. The Monte-Carlo method has a little great complexity and a different interference probability depending on parameter values, but is advantageous in that all interference environments can be simulated. The Monte-Carlo method is used to determine a possibility that a frequency can be shared with existing wireless communication systems that use the same band as or a band adjacent to that of the corresponding frequency through an interference analysis when the corresponding frequency is assigned to a new wireless service system and to suggest a technological parameter, such as a transmission mask for frequency sharing.

The MCL method and the Monte-Carlo method correspond to an analysis method suitable for the aforementioned conventional output limit method when interference between heterogeneous wireless communication devices is analyzed, and they have limits if a radio wave management system is changed into an interference management method.

Accordingly, in order to manage a new type of frequency, there is a need for a technology for analyzing interference from a viewpoint of a receiver.

PRIOR ART DOCUMENT

Patent Document (Patent Document 1) U.S. Pat. No. 6,950,665 entitled "Methodology and System for Generating a Three-Dimensional Model of Interference in a Cellular Wireless Communication Network" by Lawrence W. Swift and 1 person (Date of Patent: Sep. 27, 2005)

SUMMARY OF THE INVENTION

An object of the present invention is to provide a method and apparatus for analyzing interference in the time-space dimensions, which evaluate whether or not a permitted wireless communication system satisfies a permitted interference level at which interference needs to be accepted within a permitted area.

Technical objects of the present invention are not limited to the aforementioned object, and those skilled in the art will clearly understand other technical objects not described above from the following description.

In accordance with an aspect of the present invention, an apparatus for analyzing interference in time-space dimensions includes an evaluation area partition unit configured to partition an evaluation area into lattices in order for a receiver to determine whether a permitted interference level at which interference needs to be accepted is satisfied or not and an interference analysis unit configured to spatially evaluate the amount of interference in each of the lattices based on a result of temporal evaluation of the amount of interference in each of the lattices.

The interference analysis unit is further configured to include a time ratio comparison unit configured to temporally evaluate the amount of interference in each of the lattices and a space ratio comparison unit configured to spatially evaluate the amount of interference in each of the lattices based on a result of the evaluation received from the time ratio comparison unit.

The time ratio comparison unit is configured to compare an interference limit level excess time ratio of the amount of interference in each of the lattices with a predetermined reference time ratio.

The time ratio comparison unit is configured to increase a Good Location (GL) counter if, as a result of the comparison, an interference limit level excess time ratio of the amount of interference in each of the lattices is found to be smaller than or equal to the reference time ratio.

The time ratio comparison unit is configured to increase a Bad Location (BL) counter if, as a result of the comparison, an interference limit level excess time ratio of the amount of interference in each of the lattices is found to be greater than the reference time ratio and to store information about locations of BL lattices.

The space ratio comparison unit is further configured to calculate a BL lattice space ratio using a total number of the lattices of the evaluation area and the BL counter.

The space ratio comparison unit is further configured to compare the BL lattice space ratio with a predetermined reference space ratio.

The space ratio comparison unit is further configured to determine that the permitted interference level is satisfied in the time-space dimensions if, as a result of the comparison, the BL lattice space ratio is found to be smaller than or equal to the predetermined reference space ratio.

The space ratio comparison unit is further configured to determine that the permitted interference level is not satisfied in the time-space dimensions if, as a result of the comparison, the BL lattice space ratio is found to greater than the predetermined reference space ratio.

The apparatus further includes a parameter management unit configured to configure parameters for calculating the amount of interference and an interference amount calculation unit configured to calculate the amount of interference using the parameters.

The amount of interference is calculated in each of the lattices using the parameters configured for each lattice.

In accordance with another aspect of the present invention, a method of analyzing interference in time-space dimensions includes partitioning an evaluation area into lattices in order for a receiver to determine whether or not a permitted interference level at which interference needs to be accepted is satisfied or not, temporally evaluating the amount of interference in each of the lattices, and spatially evaluating the amount of interference in each of the lattices based on a result of the evaluation.

Temporally evaluating the amount of interference includes comparing an interference limit level excess time ratio of the amount of interference with a predetermined reference time ratio.

Comparing the interference limit level excess time ratio of the amount of interference with the predetermined reference time ratio includes increasing a GL counter if, as a result of the comparison, the interference limit level excess time ratio of the amount of interference is found to be smaller than or equal to the predetermined reference time ratio.

Comparing the interference limit level excess time ratio of the amount of interference with the predetermined reference time ratio includes increasing a BL counter if, as a result of the comparison, the interference limit level excess time ratio of the amount of interference is found to be greater than the predetermined reference time ratio and storing information about a location of a BL lattice.

Spatially evaluating the amount of interference includes calculating a BL lattice space ratio using a total number of the lattices of the evaluation area and the BL counter and comparing the BL lattice space ratio with a predetermined reference space ratio.

Comparing the BL lattice space ratio with the predetermined reference space ratio includes determining that the permitted interference level is satisfied in the time-space dimensions if, as a result of the comparison, the BL lattice space ratio is found to be smaller than or equal to the predetermined reference space ratio.

Comparing the BL lattice space ratio with the predetermined reference space ratio includes determining that the permitted interference level is not satisfied in the time-space dimensions if, as a result of the comparison, the BL lattice space ratio is found to be greater than the predetermined reference space ratio.

The method further includes configuring parameters for calculating the amount of interference and calculating the amount of interference using the parameters.

The amount of interference is calculated for each lattice using the parameters configured for each lattice.

DETAILED DESCRIPTION OF THE EMBODIMENTS

Hereinafter, embodiments of the present invention will be described in detail with reference to the accompanying drawings so that they can be readily implemented by those skilled in the art.

The present invention may be modified in various ways and may be implemented to have several embodiments. Specific embodiments are illustrated in the drawings and are described in detail.

It is however to be understood that the present invention is not intended to be limited to the specific embodiments, but that the specific embodiments include all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless defined otherwise, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in more detail with reference to the accompanying drawings. In describing the present invention, in order to help general understanding, the same reference numerals are used to denote the same elements throughout the drawings, and a redundant description of the same elements is omitted.

Figure 1:
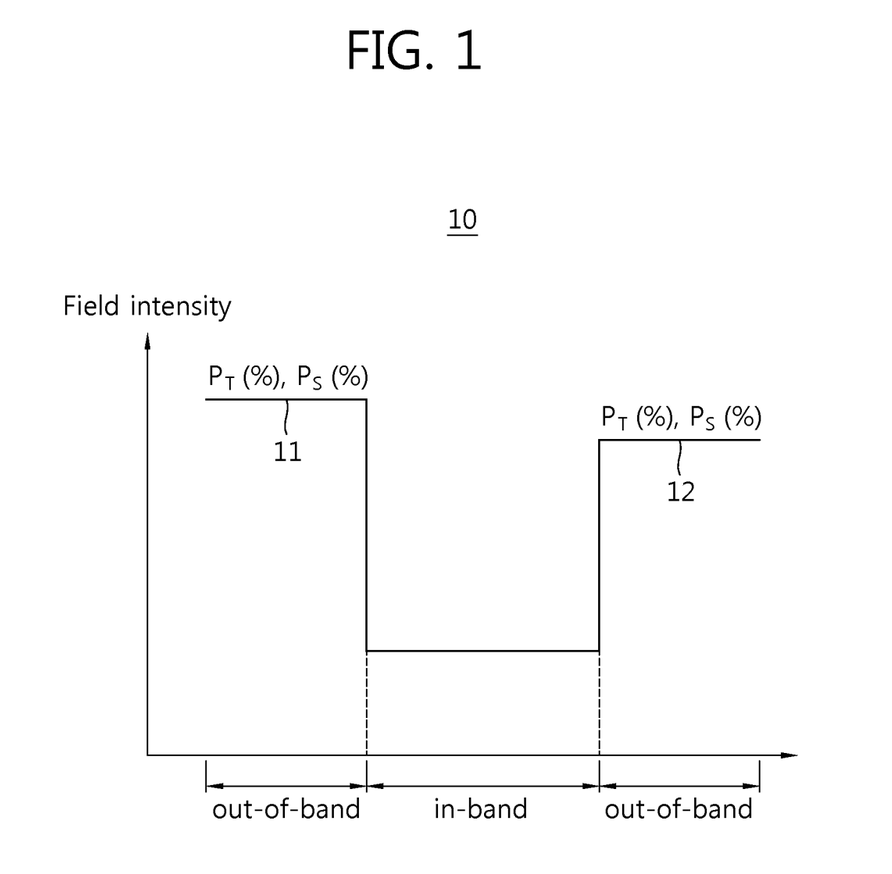
FIG. 1 is a diagram illustrating an example of a permitted interference reception field intensity reference for interference management in accordance with an embodiment of the present invention.

FIG. 1 is a diagram illustrating an example of a permitted interference reception field intensity reference for interference management in accordance with an embodiment of the present invention.

As illustrated in FIG. 1, a permitted interference reception field intensity reference 10 for interference management in accordance with an embodiment of the present invention defines an interference limit level at which the user of a receiver (not illustrated) needs to accept interference and operate using a time ratio $P_T$ (%) and a space ratio $P_S$ (%). Interference limit levels 11 and 12 in accordance with an embodiment of the present invention are designated in a frequency band (i.e., an out-of-band) (hereinafter referred to as a "neighbor frequency band") that neighbors a frequency band (i.e., an in-band) (hereinafter referred to as an "assigned frequency band") assigned to a receiver, and have field intensity in unit. Furthermore, in an embodiment of the present invention, the type of receiver is not specially limited because the receiver may be all reception devices capable of wireless communication. The user of the receiver is not allowed to make a claim for interference until an interference signal exceeds the interference limit levels.

Figure 2:
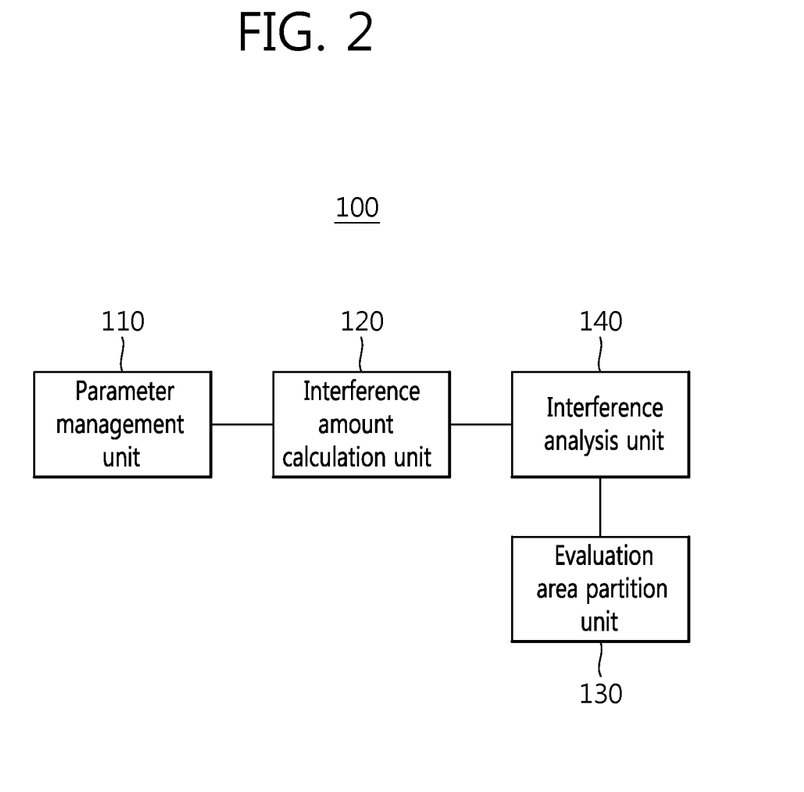
FIG. 2 is a diagram schematically illustrating an apparatus for analyzing interference in the time-space dimensions in accordance with an embodiment of the present invention.
Figure 3:
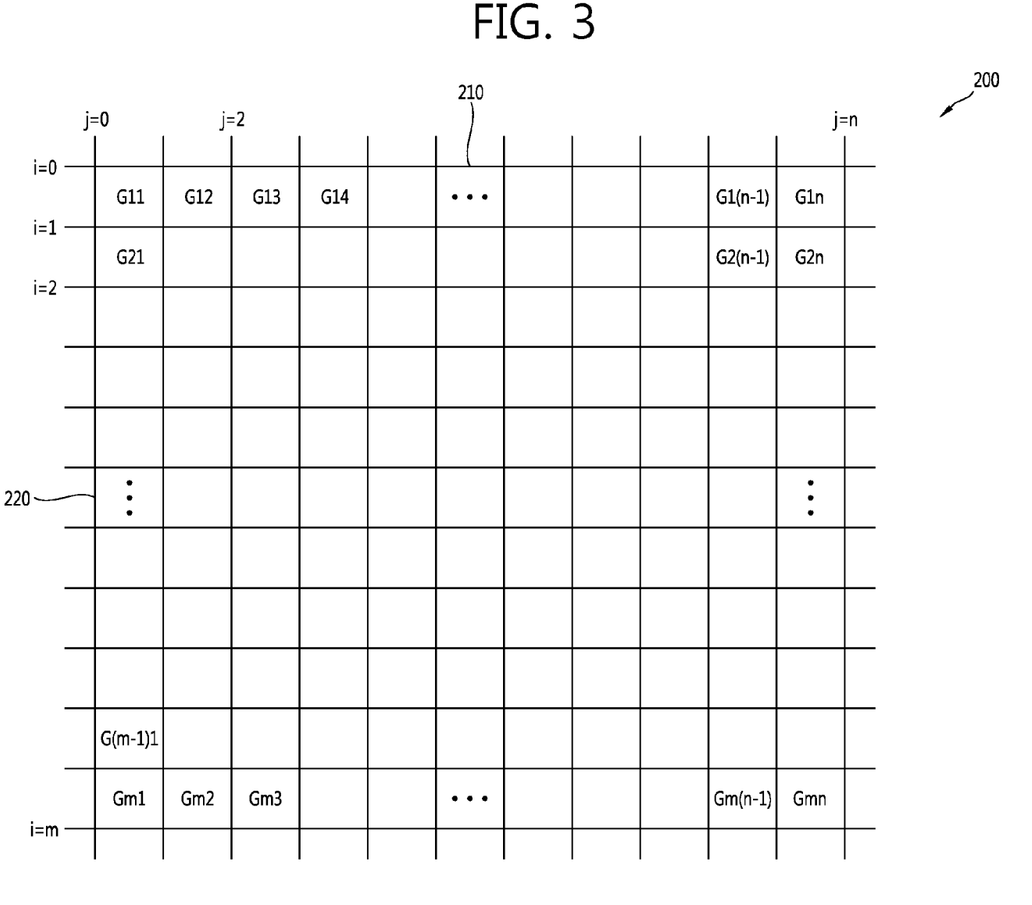
FIG. 3 is a diagram illustrating an example in which an area to be evaluated regarding whether the area satisfies a permitted interference level is partitioned into lattices in accordance with an embodiment of the present invention.
Figure 4:
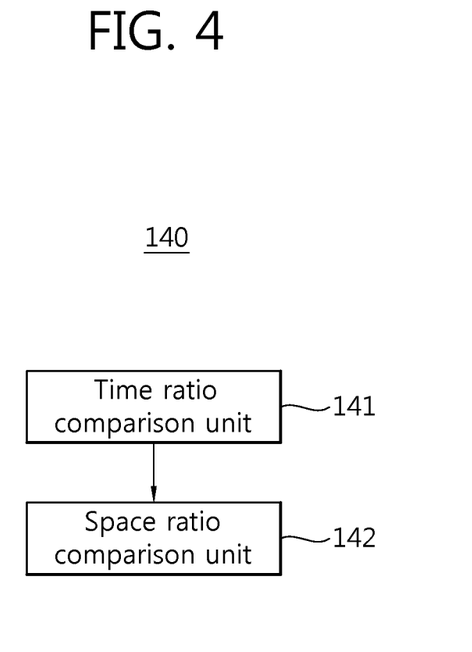
FIG. 4 is a block diagram schematically illustrating an interference analysis unit of FIG. 2.
Figure 5:
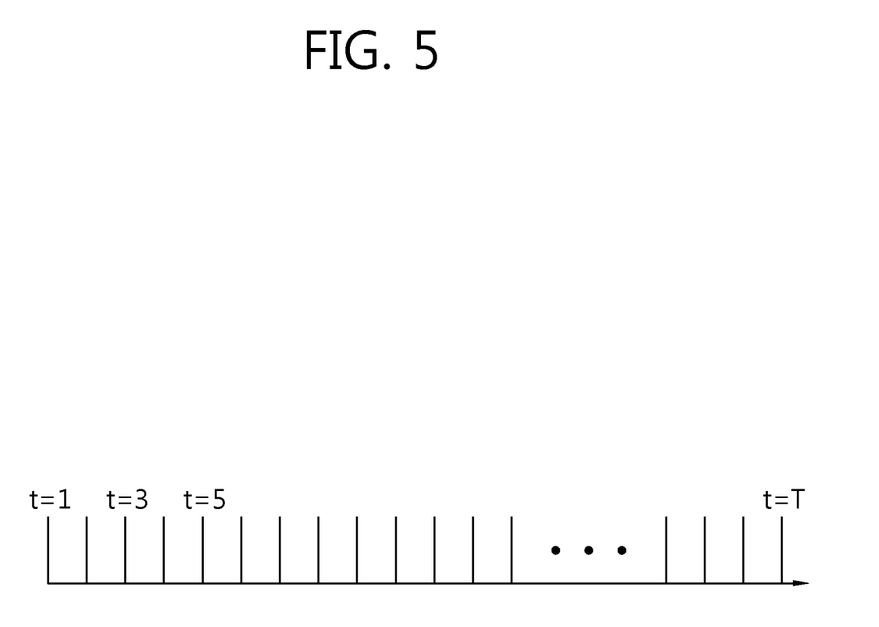
FIG. 5 is a diagram illustrating an example of an observation time for measuring the interference limit level excess time ratio of the amount of interference in accordance with an embodiment of the present invention.
Figure 6:
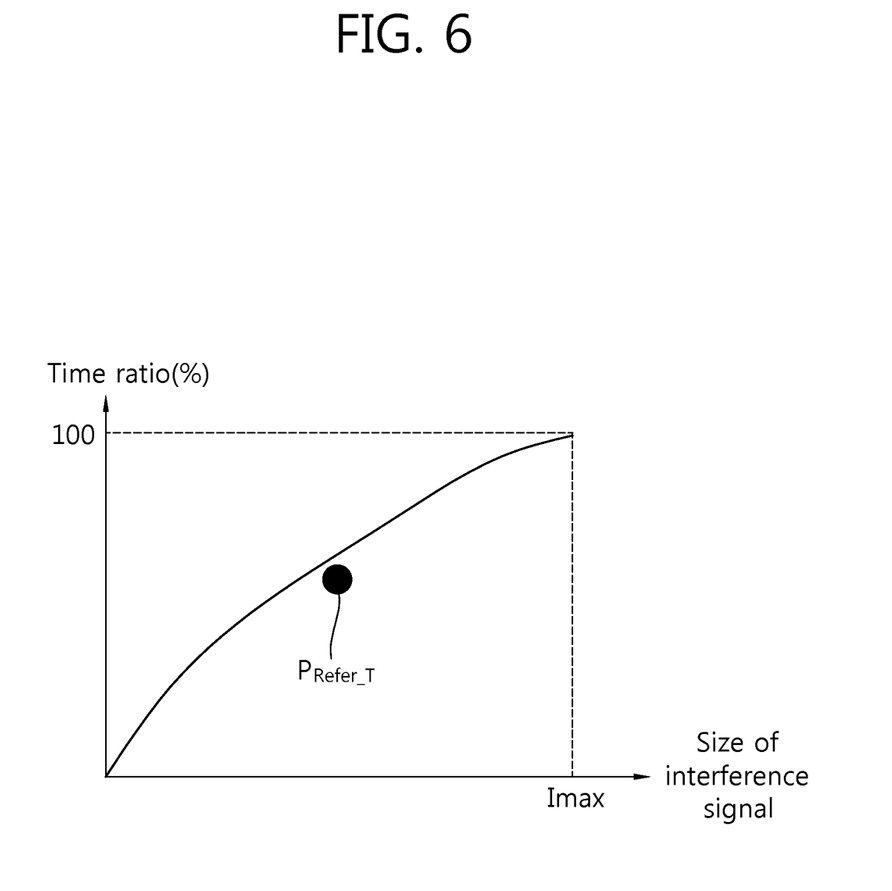
FIG. 6 is a diagram illustrating an example in which the amount of interference to the observation time illustrated in FIG. 5 exceeds an interference limit level.
Figure 7:
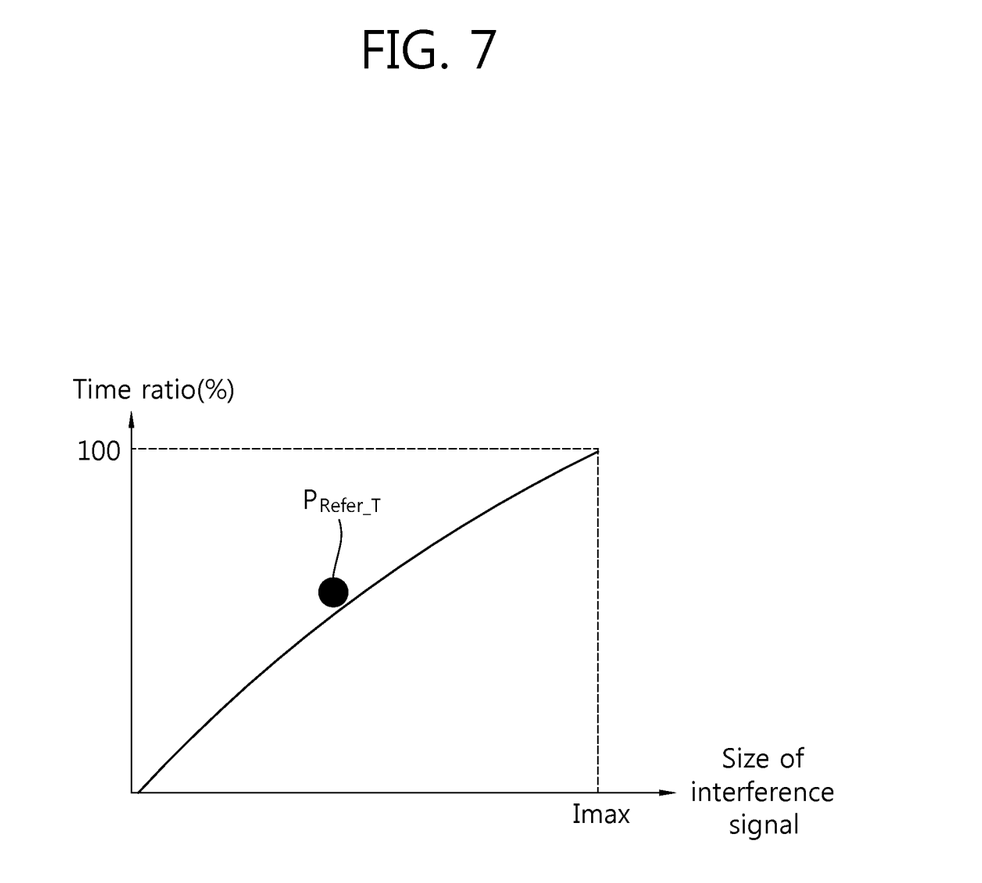
FIG. 7 is a diagram illustrating an example in which the amount of interference to the observation time illustrated in FIG. 5 satisfies the interference limit level without exceeding the interference limit level.
Figure 8:
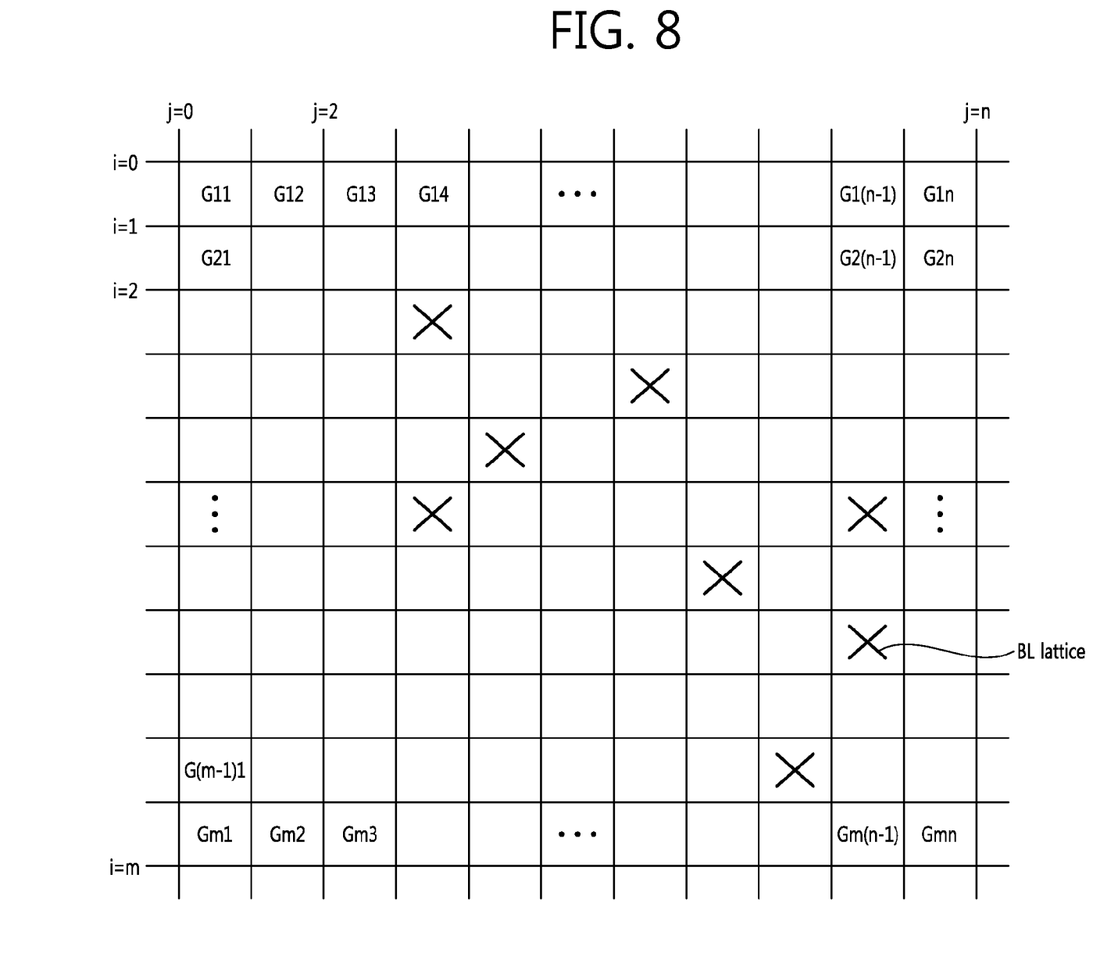
FIG. 8 is a diagram illustrating an example in which interference is spatially evaluated in accordance with an embodiment of the present invention.

FIG. 2 is a diagram schematically illustrating an apparatus for analyzing interference in the time-space dimensions in accordance with an embodiment of the present invention, FIG. 3 is a diagram illustrating an example in which an area to be evaluated regarding whether the area satisfies a permitted interference level is partitioned into lattices in accordance with an embodiment of the present invention, FIG. 4 is a block diagram schematically illustrating an interference analysis unit of FIG. 2, FIG. 5 is a diagram illustrating an example of an observation time for measuring the interference limit level excess time ratio of the amount of interference in accordance with an embodiment of the present invention, FIG. 6 is a diagram illustrating an example in which the amount of interference to the observation time illustrated in FIG. 5 exceeds an interference limit level, FIG. 7 is a diagram illustrating an example in which the amount of interference to the observation time illustrated in FIG. 5 satisfies the interference limit level without exceeding the interference limit level, and FIG. 8 is a diagram illustrating an example in which interference is spatially evaluated in accordance with an embodiment of the present invention.

As illustrated in FIG. 2, the apparatus 100 for analyzing interference in the time-space dimensions in accordance with an embodiment of the present invention may be included in a receiver, and includes a parameter management unit 110, an interference amount calculation unit 120, an evaluation area partition unit 130, and an interference analysis unit 140.

The parameter management unit 110 configures and manages all parameters required to calculate the amount of interference, such as the location between a sacrificial source, that is, a receiver, and an interference source and the height or gain of an antenna. The parameter management unit 110 notifies the interference amount calculation unit 120 that all the parameters for calculating the amount of interference have been configured. The parameters in accordance with an embodiment of the present invention are configured according to each of lattices partitioned by the evaluation area partition unit 130. The parameters configured for each lattice are transferred to the interference amount calculation unit 120.

The interference amount calculation unit 120 receives the parameters required to calculate the amount of interference from the parameter management unit 110. The interference amount calculation unit 120 calculates the amount of interference using the parameters. An equation for calculating the amount of interference is illustrated in Equation 1. The interference amount calculation unit 120 transfers the calculated amount of interference to the interference analysis unit 140. In an embodiment of the present invention, the amount of interference is calculated for each lattice and transferred to the interference analysis unit 140.

$$I = \text{EIRP}_{max} + G_{tx}(rx) - L_{path} + G_{rx}(\text{peak}) - L_{RX} + A_{pol} + A_{BW} \quad (1)$$

In Equation 1, I denotes the size of an interference signal received by a receiver, $\text{EIRP}_{max}$ denotes the Effective Isotropically Radiated Power (EIRP) of a transmitter, $G_{tx}(rx)$ denotes a relative gain of a transmission antenna toward the antenna of the receiver, $L_{path}$ denotes a path loss value between the transmitter and the receiver, $G_{rx}(\text{peak})$ denotes the antenna gain of the receiver, $L_{RX}$ denotes a receiver loss, such as a feed loss, $A_{pol}$ denotes a polarization effect-related correction factor, and $A_{BW}$ denotes a bandwidth-related correction factor.

In order for the user of the receiver to determine whether interference needs to be accepted, the evaluation area partition unit 130 partitions a permitted area (hereinafter referred to as an "evaluation area") 200 in which whether a permitted interference level is satisfied or not will be evaluated into lattices. In an embodiment of the present invention, the lattices of the evaluation area have been illustrated as being partitioned in the same size as in FIG. 3, but the present invention is not limited thereto. In other embodiments, the evaluation area may be partitioned into lattices in which a horizontal size 210 is different from a vertical size 220 depending on user setting within a range in which the results of evaluation regarding whether a permitted interference level is satisfied or not may be obtained. The evaluation area partition unit 130 generates a partition completion message in order to notify the interference analysis unit 140 that the evaluation area 200 has been partitioned into the lattices, and sends the partition completion message to the interference analysis unit 140.

Referring back to FIG. 2, the interference analysis unit 140 receives the amount of interference from the interference amount calculation unit 120 and receives the partition completion message from the evaluation area partition unit 130. In order for the user of the receiver to determine whether interference needs to be accepted or not, the interference analysis unit 140 simulates interference in the time-space dimensions. The interference analysis unit 140 includes a time ratio comparison unit 141 and a space ratio comparison unit 142 as illustrated in FIG. 4.

When the partition completion message is received from the evaluation area partition unit 130, the time ratio comparison unit 141 performs simulations on each of the lattices of the evaluation area 200 in order to determine whether or not a ratio of the time during which the amount of interference exceeds the interference limit level to an observation time (hereinafter referred to as an "interference limit level excess time ratio of the amount of interference") exceeds a predetermined reference time ratio $P_{Refer\_T}$. Furthermore, the time ratio comparison unit 141 generates temporal interference evaluation information, including the simulation results of the evaluation of temporal interference for each of the lattices of the evaluation area 200, and sends the temporal interference evaluation information to the space ratio comparison unit 142.

More specifically, referring to FIGS. 3 and 5, the time ratio comparison unit 141 receives the amount of interference in a lattice $G_{11}$ of the evaluation area 200 from the interference amount calculation unit 120. While the observation time gradually increases from t=1 to t=T, the time ratio comparison unit 141 determines whether or not an interference limit level excess time ratio of the amount of interference is greater than the reference time ratio $P_{Refer\_T}$. In this case, an example in which the interference limit level excess time ratio of the amount of interference is greater than the reference time ratio $P_{Refer\_T}$ is illustrated in FIG. 6, and an example in which the interference limit level excess time ratio of the amount of interference is smaller than or equal to the reference time ratio $P_{Refer\_T}$ is illustrated in FIG. 7. If, as a result of the determination, the interference limit level excess time ratio of the amount of interference in the lattice $G_{11}$ is found to be smaller than or equal to the reference time ratio $P_{Refer\_T}$, the time ratio comparison unit 141 increases a Good Location counter (hereinafter referred to as a "GL counter"). In contrast, if, as a result of the determination, the interference limit level excess time ratio of the amount of interference in the lattice $G_{11}$ is found to be greater than the reference time ratio $P_{Refer\_T}$, the time ratio comparison unit 141 increases a Bad Location counter (hereinafter referred to as a "BL counter") and stores information about the location of a Bad Location lattice (hereinafter referred to as a "BL lattice") $G_{11}$.

Furthermore, the time ratio comparison unit 141 receives the amount of interference in a next lattice $G_{12}$ from the interference amount calculation unit 120. The time ratio comparison unit 141 determines whether or not an interference limit level excess time ratio of the amount of interference in the next lattice $G_{12}$ is greater than the reference time ratio $P_{Refer\_T}$. In an embodiment of the present invention, it is assumed that both the GL counter and the BL counter have been initialized and set to "0" prior to the start of simulations. Likewise, the time ratio comparison unit 141 performs simulations on the remaining lattices $G_{13}$ to $G_{mn}$ in order to determine whether or not an interference limit level excess time ratio of the amount of interference in each of the remaining lattices $G_{13}$ to $G_{mn}$ is greater than the reference time ratio $P_{Refer\_T}$. Furthermore, when simulations for all the lattices of the evaluation area 200 are completed, the time ratio comparison unit 141 generates temporal interference evaluation information, including information about the locations of BL lattices, belonging to all the lattices of the evaluation area 200, and the BL counter, and transfers the temporal interference evaluation information to the space ratio comparison unit 142.

Referring back to FIG. 4, the space ratio comparison unit 142 receives the temporal interference evaluation information from the time ratio comparison unit 141. The space ratio comparison unit 142 marks the BL lattices of all the lattices of the evaluation area 200 based on the temporal interference evaluation information, an example of which is illustrated in FIG. 8. The space ratio comparison unit 142 performs simulations for evaluating spatial interference using the BL lattices marked in the evaluation area 200.

More specifically, the space ratio comparison unit 142 calculates a ratio of the space for BL lattices to a total number of lattices (hereinafter referred to as a "BL lattice space ratio") $P_{TS}$ using the total number of lattices of the evaluation area 200 and the BL counter. In this case, an equation for calculating the BL lattice space ratio is illustrated in Equation 2.

$$P_{TS} = (\text{Number of bad locations}/m*n)*100\% \quad (2)$$

In Equation 2, the number of bad locations denotes the BL counter, and m and n denotes the number of lattices. The space ratio comparison unit 142 compares the BL lattice space ratio $P_{TS}$ with the predetermined reference space ratio $P_{Refer\_S}$ as in Equation 3.

$$P_{TS} < P_{Refer\_S} \quad (3)$$

In Equation 3, $P_{TS}$ denotes the BL lattice space ratio, and $P_{Refer\_S}$ denotes a ratio of the space. If the BL lattice space ratio is smaller than or equal to the space ratio $P_{Refer\_S}$, the space ratio comparison unit 142 determines that the permitted interference level of the evaluation area 200 is satisfied in the time-space dimensions and stores the evaluation area 200 as a time-space interference-satisfactory area. In contrast, if the BL lattice space ratio is greater than the space ratio $P_{Refer\_S}$, the space ratio comparison unit 142 determines that the permitted interference level of the evaluation area 200 is not satisfied in the time-space dimensions and stores the evaluation area 200 as a time-space interference-unsatisfactory area.

Figure 9:
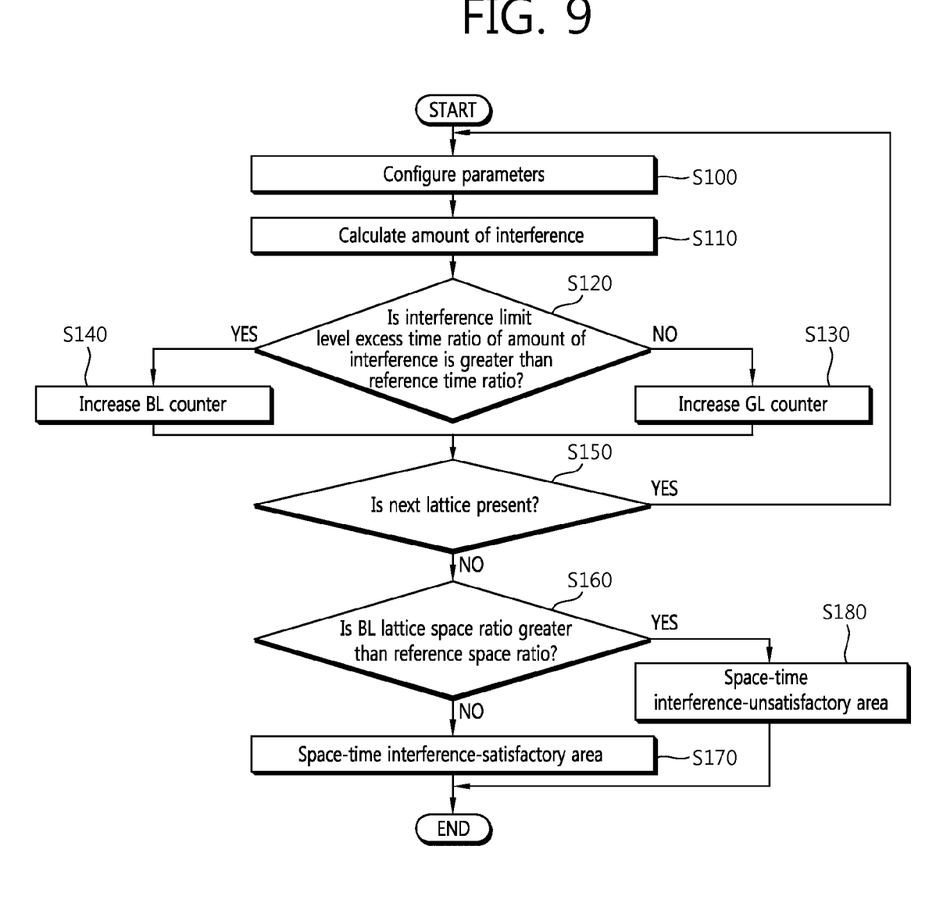
FIG. 9 is a flowchart illustrating a method for analyzing interference in the time-space dimensions in accordance with an embodiment of the present invention.

FIG. 9 is a flowchart illustrating a method for analyzing interference in the time-space dimensions in accordance with an embodiment of the present invention.

As illustrated in FIG. 9, the evaluation area partition unit 130 of the apparatus 100 for analyzing interference in the time-space dimensions in accordance with an embodiment of the present invention partitions an evaluation area into lattices in order for the user of the receiver to determine whether or not interference needs to be accepted or not. The evaluation area partition unit 130 generates a partition completion message in order to notify the interference analysis unit 140 that the evaluation area has been partitioned into lattices, and sends the partition completion message to the interference analysis unit 140.

The parameter management unit 110 configures all parameters required to calculate the amount of interference at step S100. The parameter management unit 110 notifies the interference amount calculation unit 120 that all the parameters required to calculate the amount of interference have been configured.

The interference amount calculation unit 120 receives the parameters required to calculate the amount of interference from the parameter management unit 110. The interference amount calculation unit 120 calculates the amount of interference using the parameters at step S110. The interference amount calculation unit 120 transfers the calculated amount of interference to the interference analysis unit 140.

The interference analysis unit 140 determines whether or not an interference limit level excess time ratio of the amount of interference in each of the lattices of the evaluation area 200 exceeds the reference time ratio $P_{Refer\_T}$. That is, the time ratio comparison unit 141 determines whether or not the interference limit level excess time ratio of the amount of interference in each of the lattices of the evaluation area 200 is greater than the reference time ratio $P_{Refer\_T}$ at step S120.

If, as a result of the determination at step S120, the interference limit level excess time ratio of the amount of interference in each of the lattices of the evaluation area 200 is determined to be smaller than or equal to the reference time ratio $P_{Refer\_T}$, the time ratio comparison unit 141 increases the GL counter at step S130. If, as a result of the determination at step S120, the interference limit level excess time ratio of the amount of interference in each of the lattices of the evaluation area 200 is determined to be greater than the reference time ratio $P_{Refer\_T}$, the time ratio comparison unit 141 increases the BL counter and stores information about the locations of corresponding BL lattices. Next, the time ratio comparison unit 141 determines whether or not a next lattice is present at step S150.

If, as a result of the determination at step S150, a next lattice is determined to be present, the apparatus 100 for analyzing interference in the time-space dimensions returns to step S100 and performs the subsequent processes in the same manner as that described above. If, as a result of the determination at step S150, a next lattice is determined to be not present, the time ratio comparison unit 141 determines that simulations for each of the lattices of the evaluation area 200 have been completed, generates temporal interference evaluation information, including information about the locations of BL lattices that belong to all the lattices of the evaluation area 200 and each of which has an interference limit level excess time ratio of the amount of interference greater than the reference time ratio $P_{Refer\_T}$ and the BL counter, and transfers the temporal interference evaluation information to the space ratio comparison unit 142.

The space ratio comparison unit 142 receives the temporal interference evaluation information from the time ratio comparison unit 141. The space ratio comparison unit 142 marks the corresponding BL lattices in the evaluation area 200 based on the temporal interference evaluation information. The space ratio comparison unit 142 calculates the BL lattice space ratio $P_{TS}$ of the BL counter to the total number of lattices using the total number of lattices of the evaluation area 200 and the BL counter, and determines whether or not the BL lattice space ratio $P_{TS}$ is greater than the space ratio $P_{Refer\_S}$ at step S160.

If, as a result of the determination at step S160, the BL lattice space ratio $P_{TS}$ is determined to be smaller than or equal to the space ratio $P_{Refer\_S}$, the space ratio comparison unit 142 determines that a permitted interference level of the evaluation area 200 is satisfied in the time-space dimensions and stores the evaluation area 200 as a time-space interference-satisfactory area at step S170. If, as a result of the determination at step S160, the BL lattice space ratio $P_{TS}$ is determined to be greater than the space ratio $P_{Refer\_S}$, the space ratio comparison unit 142 determines that a permitted interference level of the evaluation area 200 is not satisfied in the time-space dimensions and stores the evaluation area 200 as a time-space interference-unsatisfactory area at step S180.

In accordance with the aforementioned method and apparatus for analyzing interference in the time-space dimensions, an evaluation area is partitioned into lattices in order to evaluate whether or not a permitted interference level at which interference has to be accepted is satisfied, the amount of interference in each of the lattices is temporally evaluated, and the amount of interference of each of lattices that does not temporally satisfy the permitted interference level is spatially evaluated. Accordingly, a radio wave management system may be prepared to the progress of an interference management method.

Furthermore, time and cost required to analyze interference can be reduced compared to a prior art because a method of predicting an interference level through calculation is used, and the amount of radiated interference out of a band can be predicted in the time-space dimensions while a neighbor frequency band is served.

Although the exemplary embodiments of the present invention have been described with reference to the accompanying drawings, they are not intended to limit the scope of the present invention, and those skilled in the art may modify the present invention in various forms without departing from the spirit and scope of the present invention determined by the claims.

What is claimed is:

1. An apparatus for analyzing interference in time-space dimensions, comprising:
    an evaluation area partition unit configured to partition an evaluation area into lattices in order for a receiver to determine whether a permitted interference level at which interference needs to be accepted is satisfied or not; and
    an interference analysis unit configured to temporally evaluate an amount of interference in each of the lattices and spatially evaluate an amount of interference in each of the lattices based on the result of temporal evaluation of the amount of interference in each of the lattices, and
    wherein the interference analysis unit is configured to compare an interference limit level excess time ratio of the amount of interference in each of the lattices with a predetermined reference time ratio.

2. The apparatus of claim 1, wherein the interference analysis unit is further configured to comprise:
    a time ratio comparison unit configured to temporally evaluate the amount of interference in each of the lattices; and
    a space ratio comparison unit configured to spatially evaluate the amount of interference in each of the lattices based on a result of the evaluation received from the time ratio comparison unit.

3. The apparatus of claim 2, wherein the space ratio comparison unit is further configured to calculate a Bad Location (BL) lattice space ratio using a total number of the lattices of the evaluation area and the BL counter.

4. The apparatus of claim 3, wherein the space ratio comparison unit is further configured to compare the BL lattice space ratio with a predetermined reference space ratio.

5. The apparatus of claim 4, wherein the space ratio comparison unit is further configured to determine that the permitted interference level is satisfied in the time-space dimensions if, as a result of the comparison, the BL lattice space ratio is found to be smaller than or equal to the predetermined reference space ratio.

6. The apparatus of claim 4, wherein the space ratio comparison unit is further configured to determine that the permitted interference level is not satisfied in the time-space dimensions if, as a result of the comparison, the BL lattice space ratio is found to greater than the predetermined reference space ratio.

7. The apparatus of claim 1, wherein the time ratio comparison unit is configured to increase a Good Location (GL) counter if, as a result of the comparison, an interference limit level excess time ratio of the amount of interference in each of the lattices is found to be smaller than or equal to the reference time ratio.

8. The apparatus of claim 1, wherein the time ratio comparison unit is configured to increase a Bad Location (BL) counter if, as a result of the comparison, an interference limit level excess time ratio of the amount of interference in each of the lattices is found to be greater than the reference time ratio and to store information about locations of BL lattices.

9. The apparatus of claim 1, further comprising:
a parameter management unit configured to configure parameters for calculating the amount of interference; and
an interference amount calculation unit configured to calculate the amount of interference using the parameters.

10. The apparatus of claim 9, wherein the amount of interference is calculated in each of the lattices using the parameters configured for each lattice.

11. A method of analyzing interference in time-space dimensions, comprising:
partitioning an evaluation area into lattices in order for a receiver to determine whether or not a permitted interference level at which interference needs to be accepted is satisfied or not;
temporally evaluating an amount of interference in each of the lattices; and
spatially evaluating an amount of interference in each of the lattices based on a result of the evaluation,
wherein temporally evaluating the amount of interference comprises comparing an interference limit level excess time ratio of the amount of interference with a predetermined reference time ratio.

12. The method of claim 11, wherein comparing the interference limit level excess time ratio of the amount of interference with the predetermined reference time ratio comprises increasing a Good Location (GL) counter if, as a result of the comparison, the interference limit level excess time ratio of the amount of interference is found to be smaller than or equal to the predetermined reference time ratio.

13. The method of claim 11, wherein comparing the interference limit level excess time ratio of the amount of interference with the predetermined reference time ratio comprises:
increasing a Bad Location (BL) counter if, as a result of the comparison, the interference limit level excess time ratio of the amount of interference is found to be greater than the predetermined reference time ratio; and
storing information about a location of a BL lattice.

14. The method of claim 13, wherein spatially evaluating the amount of interference comprises:
calculating a BL lattice space ratio using a total number of the lattices of the evaluation area and the BL counter; and
comparing the BL lattice space ratio with a predetermined reference space ratio.

15. The method of claim 14, wherein comparing the BL lattice space ratio with the predetermined reference space ratio comprises determining that the permitted interference level is satisfied in the time-space dimensions if, as a result of the comparison, the BL lattice space ratio is found to be smaller than or equal to the predetermined reference space ratio.

16. The method of claim 14, wherein comparing the BL lattice space ratio with the predetermined reference space ratio comprises determining that the permitted interference level is not satisfied in the time-space dimensions if, as a result of the comparison, the BL lattice space ratio is found to be greater than the predetermined reference space ratio.

17. The method of claim 11, further comprising:
configuring parameters for calculating the amount of interference; and
calculating the amount of interference using the parameters.

18. The method of claim 17, wherein the amount of interference is calculated for each lattice using the parameters configured for each lattice.

* * * * *